United States Patent [19]

Gimbutas et al.

[11] Patent Number: 5,066,085
[45] Date of Patent: Nov. 19, 1991

[54] FIBER OPTIC CURTAIN

[75] Inventors: Aidas Gimbutas; Marion Gimbutas, both of Wilmington, Del.

[73] Assignee: Main Light Inc., Wilmington, Del.

[21] Appl. No.: 594,634

[22] Filed: Oct. 9, 1990

[51] Int. Cl.[5] .............................................. G02B 6/00
[52] U.S. Cl. ..................... 385/115; 362/32; 26/69 C; 19/145.3; 245/21; 385/147; 385/901
[58] Field of Search ......................... 350/96.10, 96.20; 362/32; 26/69 B, 69 C; 19/145.3; 245/2, 11; 39/383 R, 420 A, 427

[56] References Cited

U.S. PATENT DOCUMENTS

| | | | |
|---|---|---|---|
| 4,052,120 | 10/1977 | Sick et al. | 350/96.10 |
| 4,234,907 | 11/1980 | Daniel | 362/103 X |
| 4,538,527 | 9/1985 | Kitchen | 350/96.10 X |
| 4,629,858 | 12/1986 | Kyle | 26/69 B |
| 4,691,744 | 9/1987 | Haver et al. | 245/2 X |
| 4,867,820 | 9/1989 | Jacobson et al. | 350/96.10 X |

FOREIGN PATENT DOCUMENTS 3247690  7/1984  Fed. Rep. of Germany ...... 26/69 B

Primary Examiner—Akm Ullah
Attorney, Agent, or Firm—Connolly and Hutz

[57] ABSTRACT

A fiber optic curtain when activated projects a multitude of bright pinpoints of light without the use of electrical wires or lamp filaments for illumination. The curtain has one or more cloth panels with attached fiber optic strands having tips substantially perpendicular to and substantially flush with the front face of the panels. Bright pinpoints of light are formed at the tips when the other ends of the fiber optic strands are connected to a light source, but the tips are not visible before the light source is activated.

9 Claims, 2 Drawing Sheets

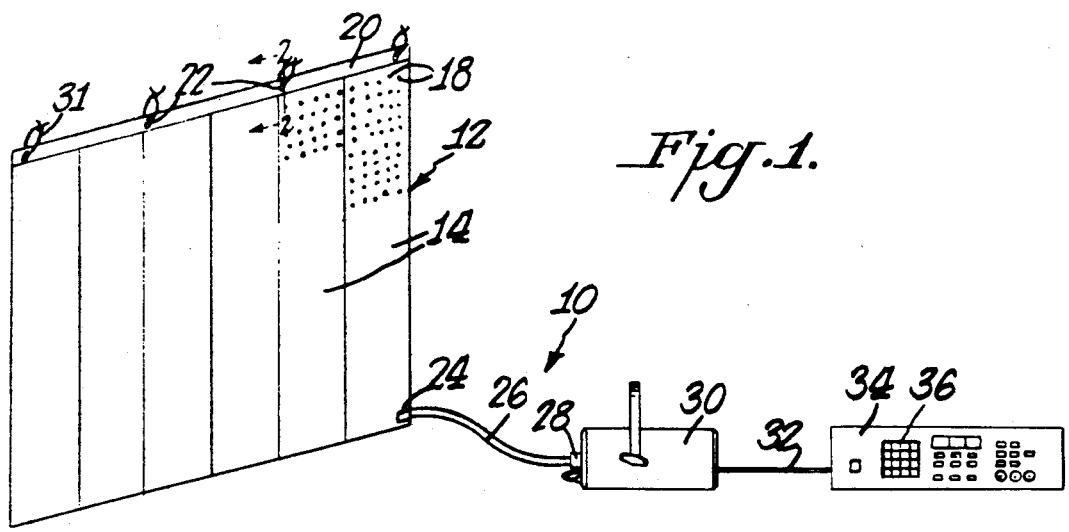
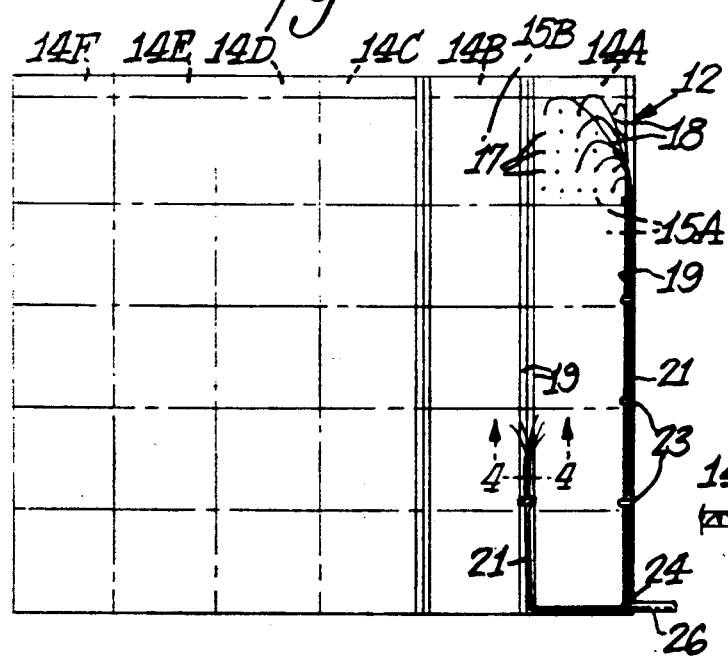
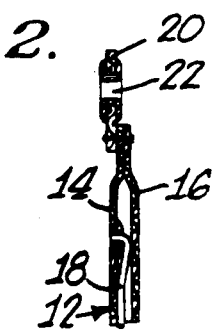

FIBER OPTIC CURTAIN

BACKGROUND OF THE INVENTION

The present invention relates to a fiber optic curtain and a method of making such curtain. The curtains have a plurality of fiber optic strands inserted through the face fabric from behind and attached to the fabric with the fiber tips facing the audience. The other end of the fibers are gathered into a bundle and connected to an external light source, which transmits the light through the fiber strands. The result is a bright pinpoint of light at the end of the fiber tips, without using any electrical wires or lamp filaments for illumination. Fiber optic curtains can be used as a backdrop for the theatrical, special event, entertainment industry and as a wall hanging in houses, hotels, motels or businesses.

U.S. Pat. No. 4,052,120 discloses an optical apparatus for producing a light curtain or light distributing arrangement using a collimated light source, mirrors and two fiber optic rods to produce a sheet of colored light. This patent does not disclose a fabric curtain having fiber optic strands inserted therethrough to produce bright pinpoints of light.

SUMMARY OF THE INVENTION

The present invention relates to a method of making a fiber optic curtain. In this method flameproof cloth panels are placed over a foam substrate and temporarily stretched across that foam. The tips of one or more fiber optic strands are inserted into holes punched substantially perpendicularly through the cloth and foam substrate. The holes may be punched randomly or in a matrix or design. The strands are individually secured to the cloth with a glob of adhesive applied around each strand. Once the adhesive has set, the foam backer and cloth are separated with care and the exposed tip portion of the strands is sheared off so that the ends of the strands are substantially flush with the front face of the cloth panel. Preferably, one or more bundles of the individual fiber optic strands are attached to the back face of the cloth panel, with one end of the bundle connected to a light source that may be programmably controlled. The individual fiber optic strands attached to the cloth panels and the bundle of such strands are covered by a non-light transmitting fabric backer attached to the rear face of the cloth panels. A means for hanging the curtain, such as a webbing with grommets, is attached to the top of the cloth panel and fabric backer combination. The cloth panel, attached fiber strands, fabric backer and a means for hanging form the fiber optic curtain.

The invention also relates to a fiber optic curtain comprising one or more cloth panels with attached fiber optic strands having tips substantially perpendicular to and substantially flush with the front face of the panels so that bright pinpoints of light are formed at the tips when the other ends of the fiber strands are connected to a light source that may be programmably controlled. Preferably the individual fiber optic strands are bundled together at one end and protected by a plastic tubing or sheath. The bundle can be inserted into a pocket formed in the rear face of the cloth panel at the bottom or top hem. Individual fiber optic strands separated from the bundle at one end are inserted into and attached to the rear face of the cloth panel. A cloth backer attached to the rear face of the cloth panels covers the fiber optic strands and bundles. The curtain may be supplied with a means for hanging, such as an attached webbing strip with grommets, and may have a weighted hem to ensure that the fabric will hang straight.

It is an object of the present invention to provide a fiber optic curtain that, when activated, projects a multitude of bright pinpoints of light without the use of electrical wires or lamp filaments for illumination. Before being activated, the fiber tips are completely invisible.

It is a further object of this invention to provide a fiber optic curtain having bright pinpoints of light of varying color and intensity.

It is still a further object of this invention to provide a method of making a fiber optic curtain.

Novel features and advantages of the present invention in addition to those noted above will become apparent to those of ordinary skill in the art from a reading of the following detailed description in conjunction with the accompanying drawings.

BRIEF DESCRIPTION OF THE DRAWINGS

FIG. 1 is a pictorial view of a fiber optic curtain with light projector and controller;

FIG. 2 is a partial cross-sectional view taken along line 2—2 of FIG. 1;

FIG. 3 is a side elevational view of the rear face of the fiber optic curtain;

FIG. 4 is a partial cross-sectional view taken along line 4—4 of FIG. 3;

DETAILED DESCRIPTION OF THE INVENTION

Figure 5:
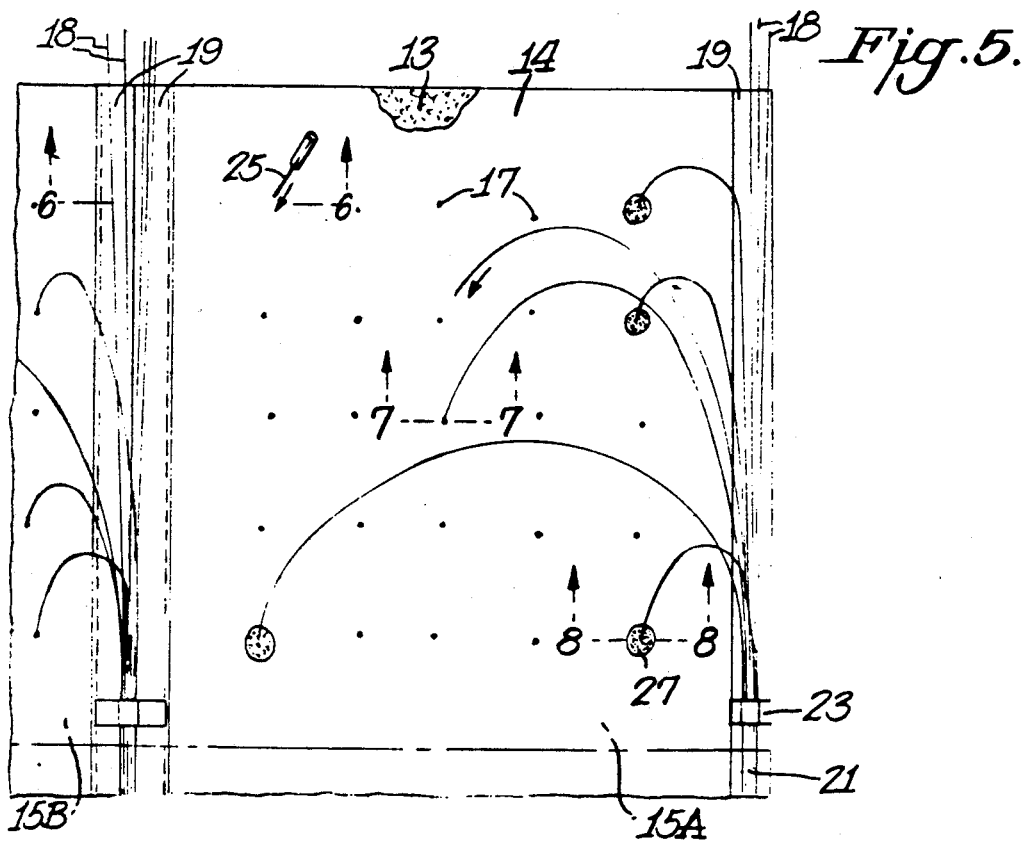
FIG. 5 is a fragmental side elevational view of the fiber optic curtain illustrating one circuit step of the method according to the present invention.

Referring particularly to the drawings, wherein like numerals denote identical parts in the various views, FIG. 1 shows a pictorial view of the fiber optic curtain assembly 10. The curtain 12 comprises one or more cloth panels 14 attached together, such as by sewing. At the top of the curtain 12 a webbing strip 20 with grommets 22 may be provided as a means for hanging the curtain 12 by straps or hooks 31 to a curtain rod (not shown). At the bottom of the curtain 12 a pocket 24 is provided in the hem. Fiber optic strands 18 are attached at their tip to the panels 14 and at their other end to a light source 30. The light source 30 can be controlled with a programmable 36 controller 34, connected to the light source by an electrical connector 32. Preferably, the individual fiber optic strands 18 are bundled together at one end and inserted into a sheath 26, such as a plastic tube, and the sheathed end of the strands 18 is connected by a fitting 28 to the light source 30.

The light source 30 can be a "Color Pro" light projector that projects the primary colors of light—red, green and blue. The "Color Pro" light projector is controlled with a "Color Pro" programmable controller, which can be programmed with the touch panel controls to store various commands to control color, hue and intensity. These "Color Pro" products are manufactured by Light Wave Research of Austin, Texas.

FIG. 3 is a side-elevational view of the rear face of fiber optic curtain 12. Several cloth panels 14 A-E are attached together, such as by sewing, to form a curtain 12. The joining of two panels 14 forms a seam 19. Preferably, the cloth panels 14 are flameproofed 100% cotton, black velour material, such as SUPERCOTE 29776 with a weight of 18-21 oz. A flameproofed polyester or cotton-polyester blend fabric may also be used. The fabric must be of sufficient weight or thickness to hold the fiber optic strands 18 without pulling or tearing. In addition other fabric colors may be used. The chosen fabric must not permit light to permeate therethrough. The fabric has a standard 54" fabric width, suitable for curtains.

Each cloth panel 14 A-E has a width of about four feet and a length of about 20 feet. A series of panels 14 can be joined together to form a sheet of maximum width of about 40 feet.

As shown, the cloth panels 14 are each divided into five four-foot-square circuits 15 A-B, but any number of circuits could be used depending on height requirements. Each circuit 15 A, with an area of 16 square feet, contains between 20 and 60 tips of fiber optic strands 18, depending upon the number of different color outputs desired. For example, if bright points of only a single light color are desired, each circuit is provided with up to 36 points per 16 square feet. If, however, three separate light colors are desired, each circuit is provided with a total of 60 points, up to 20 for each of the light colors.

As stated, the fiber optic strands 18 are bundled together 21 and sheathed 26 for connection to the light source 28, 30. The sheath 26 must not permit light to pass therethrough and may be made of opaque plastic or other suitable material. There may be as many as about 370 strands 18 in a single bundle 26. Suitable fiber optic strands 18 measure 0.75 mm in diameter and are about eight feet long, although strands of different diameter and length may be used, depending upon the curtain height and desired lighting effect. The fiber optic strands 18 may be clad or unclad polymer optical fibers. A U Grade (attenuation 0.14-0.18 dB/m) polymer optical fiber, catalog number PG-U-FB750 sold by Toray Industries, Inc. of Chiba, Japan, works very well.

The bundled fibers 21 are preferably inserted into a pocket 24 formed either in the bottom hem or at the top of the panels 14. FIG. 1 shows only the embodiment where the pocket 24 is at the bottom hem. The bundle 21 is attached with a strong tape 23 or other suitable adhesive means to the rear face of the cloth panels 14. Preferably, the bundle 21 is so attached at the seam 19 between two panels 14 A-B (see FIG. 4) or at the side edge of an outer panel 14 A (see FIG. 3). Each bundle 21 is devoted to a separate panel 14A-E in an orderly arrangement, such as shown in FIG. 3. Where several light colors are to be simultaneously displayed in a circuit 15, however, more than one bundle 21 may be devoted to a separate panel 14 A-E and each of these different bundles 21 will be connected to a different light source 30.

As best shown in FIG. 2, the fiber optic curtain 12 has a backing or lining 16 attached to the rear face of the cloth panels 14 A-E, such as by sewing. The backing 16 protects the bundles 21 and fiber optic strands 18 and gives the back of the fiber optic curtain 12 a finished, professional appearance. The backing fabric is a flameproofed 100% cotton black lining denim, although other suitable fabrics and colors may be used.

Figure 6:
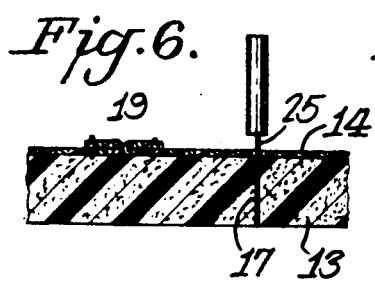
FIG. 6 is a partial cross-sectional view taken along line 6—6 of FIG. 5.

FIGS. 5-10 best illustrate the method of assembling a fiber optic curtain 12 according to the invention. First, the front face of the cloth panels 14 is stretched over a foam substrate 13, preferably of high density foam, about ¼ inch in thickness, and attached with pins or double-faced tape. Next, a series of holes 17 are punched through both the panels 14 and foam substrate 13 with an awl 25 or other suitable punching means (FIG. 6). It is advantageous to punch the holes 17 passing the punching tool in one motion first through the panels 14 and then the foam substrate 13. Care is taken to punch the holes 17 substantially perpendicular to the cloth panel 14 and foam substrate 13. Typically, the holes 17 will be punched in some random pattern in the circuit 15. If a matrix or design is desired, a template (not shown) may be used to direct placement of the holes 17 within a circuit 15. As stated, there may be as many as 60 holes 17 in one circuit 15 of the cloth panel 14. FIG. 5 shows a circuit 15A with 25 holes.

Figure 7:
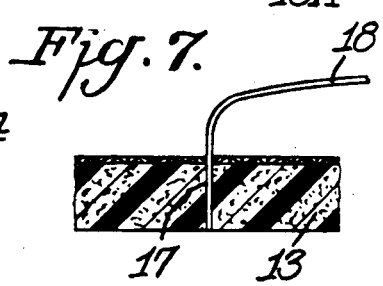
FIG. 7 is a partial cross-sectional view taken along line 7—7 of FIG. 5.
Figure 8:
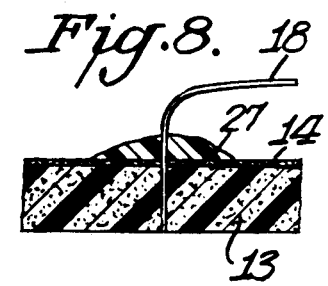
FIG. 8 is a partial cross-sectional view taken along line 8—8 of FIG. 5.
Figure 9:
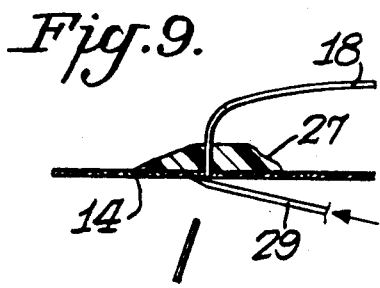
FIG. 9 is a partial cross-sectional view showing the shearing of the exposed tip of a fiber optic strand.

Next, the tip of an individual fiber optic strand 18 is inserted from the rear face of the cloth panel 14 into the hole 17 in the cloth panel 14 and foam substrate 13 (FIG. 7). The tip of the fiber optic strand 18 is taken from a bundle 21 of such strands 18 attached to the rear face of the panel 14 with tape 23. The other end of the strand 18 remains in the bundle 21. The inserted fiber optic strand 18 is glued to the rear face of the cloth panel 14. A glob of adhesive 27 substantially surrounds the fiber optic strand 18 to hold it in place, oriented substantially perpendicularly to the front and rear faces of the cloth panel 14 (FIG. 8). A preferred adhesive is a styrene-based clear adhesive sealant, such as E-6000 manufactured by Eclectic Products, Inc. of Carson, California. After the adhesive 27 has set completely, the foam substrate 13 and cloth panels 14 are carefully separated, leaving the tips of the fiber optic strands 18 protruding from the front face of the cloth panels 14. These tips are sheared off with a scissors, shears or other cutting tool 29 so that the tips of the fiber optic strands 18 will be substantially flush with the front face of the cloth panels 14 (FIG. 9).

Figure 10:
FIG. 10 is a partial cross-sectional view showing a portion of an assembled fiber optic curtain having a fiber optic strand inserted through a hole and attached with adhesive to a cloth panel and covered with a fabric backing.

Lastly, a backing fabric 16 is attached to the rear face of the cloth panels 14 to cover and protect the glued fiber optic strands 18 (FIG. 10). Preferably the backing 16 is a black or dark denim and is sewn to the cloth panel 14.

Where it is desired to display only pinpoints of a single color of light, the bundles 21 of fiber optic strands 18 from all of the circuits 15 in the cloth panels 14 are connected to only a single light source 30. Where a display of more than one color in a circuit 15 is desired, separate bundles 21 are connected to separate light sources 30.

The fiber optic curtain 12 can also be separated into vertical zones comprising one or more cloth panels 14 A-E, wherein the bundles 21 of fiber optic strands 18 in a zone are connected to one or more light sources 30, different from the light sources 30 connected to the bundles 21 of fibers 18 in another curtain zone. With this capability to use a variety of light colors in one or many zones the fiber optic curtain 12 of the present invention can project bright pinpoints of light in a matrix or design such as a company or private logo, as well as in any random color display. The curtain 12 can be used as a backdrop for the theatrical, special event and entertainment industry or other commercial and domestic use.

Many other desirable and advantageous features of this invention will become apparent from the foregoing disclosure. Moreover, while the disclosure explains important aspects of this invention in considerable detail for purposes of illustration, it will be understood by those skilled in the art that many of these details may be varied without departing from the spirit and scope of the invention.

We claim:

1. A fiber optic curtain, comprising:
    a cloth panel having a front face and a rear face; and
    a fiber optic strand having a tip at one end with the tip inserted into a hole through the cloth panel from the rear face and secured with adhesive applied around the strand at the rear face of the panel so that the tip is substantially perpendicular to and substantially flush with the front face of the cloth and the other end of the fiber optic strand is connected to a light source.

2. The fiber optic curtain of claim 1 further comprising a means for hanging the curtain.

3. The fiber optic curtain of claim 1 wherein the adhesive is a styrene-based clear adhesive sealant.

4. The fiber optic curtain of claim 1 wherein the ends of a plurality of the fiber optic strands are bundled together.

5. The fiber optic curtain of claim 4 wherein the bundle of strands is encased in a sheath.

6. The fiber optic curtain of claim 4 wherein the bundle of fiber optic strands is inserted into a pocket at the top hem of the cloth panel and attached to the rear face of the cloth panel.

7. The fiber optic curtain of claim 1 wherein the bundle of fiber optic strands is inserted into a pocket at the bottom hem of the cloth panel and attached to the rear face of the cloth panel.

8. The fiber optic curtain of claim 1 wherein the light source can be programmably controlled.

9. The fiber optic curtain of claim 1 wherein the bottom hem of the curtain is weighted.

* * * * *